United States Patent
Kumano et al.

(10) Patent No.: US 7,245,486 B2
(45) Date of Patent: Jul. 17, 2007

(54) COOLING AIR INTAKE STRUCTURE AND DESK TOP COMPUTER

(75) Inventors: Daigaku Kumano, Tokyo (JP); Norio Kobayashi, Kanagawa (JP); Ryuta Kanno, Kanagawa (JP); Shigeru Kurosu, Tokyo (JP); Yoshihiro Nakamura, Kanagawa (JP); Katsunori Kitaru, Chiba (JP); Masazumi Kaino, Saitama (JP); Masayuki Ishikawa, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/122,576

(22) Filed: May 5, 2005

(65) Prior Publication Data
US 2006/0039107 A1    Feb. 23, 2006

(30) Foreign Application Priority Data
May 7, 2004    (JP) ............................. 2004-139137

(51) Int. Cl.
*G06F 1/16*    (2006.01)

(52) U.S. Cl. .................. 361/687; 361/695; 62/229
(58) Field of Classification Search ........ 361/695–697, 361/704, 724–727, 679–687; 62/229
See application file for complete search history.

(56) References Cited

U.S. PATENT DOCUMENTS

| 4,352,274 | A | * | 10/1982 | Anderson et al. | ............. 62/229 |
| 5,287,244 | A | * | 2/1994 | Hileman et al. | ............. 361/687 |
| 5,440,450 | A | * | 8/1995 | Lau et al. | .................... 361/695 |

* cited by examiner

*Primary Examiner*—Hung Van Duong
(74) *Attorney, Agent, or Firm*—Oblon, Spivak, McClelland, Maier & Neustadt, P.C.

(57) ABSTRACT

A cooling air intake structure of a desk-top computer having a housing containing a mother board with a processor, includes one of a passage frame extending from one side to the other side of the housing, defining a passage penetrating through the housing and having a predetermining cross-sectional area, and a recess portion, on each of the sides of the housing, having a predetermined cross-sectional area. The passage frame and the recess portion have a plurality of air intake vents in the wall thereof.

11 Claims, 8 Drawing Sheets

COOLING AIR INTAKE STRUCTURE AND DESK TOP COMPUTER

CROSS REFERENCES TO RELATED APPLICATIONS

The present invention contains subject matter related to Japanese Patent Application JP 2004-139137 filed in the Japanese Patent Office on May 7, 2004, the entire contents of which are incorporated herein by reference.

BACKGROUND OF THE INVENTION

1. Field of the Invention

The present invention relates to a cooling air intake structure and a desk-top computer employing the same.

2. Description of the Related Art

Computer performance, particularly of personal computers, has substantially advanced. The amount of heat generated by a processor (hereinafter central processing unit (CPU)) of a computer increases accordingly. A cooling system for quickly discharging a large amount of heat generated by the CPU out of the computer becomes important.

A heat dissipation pad, a heat sink, a heat pipe, a cooling fan, etc. are used alone or in combination to cool the computer. In high-performance computers, particularly, desk-top computers, a CPU thereof, from among components, generating the largest amount of heat is directly cooled by one of an axial fan and a flat fan. To directly cool the CPU with the axial fan, a heat sink is arranged between the axial fan and the CPU as disclosed in Japanese Unexamined Patent Application Publication No. 2001-42973.

To take in cooling air into the computer from the outside, a large number of air intake vents are opened on one of a front panel and a side panel of a housing of a computer. As shown in FIG. 8, a large number of air intake vents are opened on a front panel of the computer housing, for example.

Japanese Unexamined Patent Application Publication No. 2003-306186 discloses a computer cooling device using a cross-flow fan.

According to the disclosure, a cross-flow fan is arranged in addition to one of the axial fan and the flat fan directly cooling the CPU. The cross-flow fan outputs an air flow wide enough to be directed to a heat emission member mounted on a mother board. An air flow is directly blown on the heat emission member or on a structure surrounding the heat emission member so that heated air does not reside near the mother board. To take in external air, a large number of air intake vents are opened on the side surfaces of the computer.

Water-cooled computers have also proposed. FIG. 9 illustrates a computer 1 having a water-cooling system.

As shown in FIG. 9, the computer 1 includes the water-cooling system that cools a CPU 3 mounted on a mother board 2 by circulating cooling water. In the cooling system, the CPU 3 is covered with a cooling-water jacket made of copper. Silicone grease having a high thermal conductivity is applied on a contact surface of the jacket so that heat generated by the CPU 3 is efficiently absorbed by a cooling liquid. The cooling liquid having absorbed heat is conveyed to a radiator via a reserve tank 5 and a passage frame 7 to a heat sink 9 that is projected backward from the back plane of the computer 1. Heat of the cooling liquid is discharged outside the computer 1 by a large power-supply fan 8. Cooled liquid is then circulated back to the cooling jacket 4 by a high-performance compact pump 6. The pump 6 controls the flow rate of the cooling liquid in accordance with the temperature of the CPU 3, thereby maintaining low noise level. The cooling liquid of the water-cooling system contains a glycolic anti-freeze liquid to prevent the passage frame 7 and the reserve tank 5 from corroding.

SUMMARY OF THE INVENTION

Heat generated in the computers is more problematic year by year as computer specifications become more sophisticated. The cooling systems (disclosed in Japanese Unexamined Patent Application Publication No. 2001-42973 and Japanese Unexamined Patent Application Publication No. 2003-306186) are not sufficient to cool the computer.

A large number of air intake vents opened on one of the front panel and the side panel to take in cooling air is aesthetically not preferable.

If the CPU is directly cooled by the axial fan via the heat sink, a relatively small fan is typically used. For this reason, the rotational speed of the fan needs to be increased. The noise of the fan becomes louder, and the sound of wind is generated when the air passes through the air intake vents on the front panel or the side panel of the housing of the computer. The sound of an operating hard disk is leaked out of the housing.

The disclosed computer having the water-cooling system uses the fan to take in air, and a large number of air intake vents are thus opened on the side panel of the housing of the computer. The use of the large number of vents is aesthetically not preferable.

If the air intake vents are opened on one side of the housing of the known computer, an air intake efficiency is lowered if any object is in the way of air flow on that side.

It is desirable to provide a cooling air intake structure and a desk-top computer using the air intake structure that achieve aesthetically preferable design, low-noise feature, and efficient cooling.

In accordance with one embodiment of the present invention, a cooling air intake structure of a desk-top computer having a housing containing a mother board with a processor, includes one of a passage frame, extending from one side to the other side of the housing, and defining a passage penetrating through the housing, the passage having a pre-determining cross-sectional area, and a recess portion, on each of the sides of the housing, having a predetermined cross-sectional area, each of the passage frame and the recess portion having a plurality of air intake vents in the wall thereof.

One of the passage frame and the recess portion is preferably arranged close to an internal component to be cooled inside the housing.

The cooling air intake structure of the desk-top computer includes one of the passage frame extending from one side to the other side of the housing, defining a passage penetrating through the housing and having a predetermining cross-sectional area, and the recess portion, on each of the sides of the housing, having a predetermined cross-sectional area. With this arrangement, an air intake mechanism is provided without opening the air intake vents on the front panel and the side panel of the computer. The arrangement is aesthetically preferable because the air intake vent is opened in an area hidden in an outside view. The arrangement is free from the sound of wind blowing that could be generated if air is taken in through the air intake vents on the front panel and the side panel. The arrangement controls the leak of the noise of the cooling fan and the sound of an operating hard disk out of the housing. With one of the passage frame and the recess portion arranged close to the component to be cooled, cooling air is directly introduced, and efficient cooling is achieved.

In accordance with one embodiment of the present invention, a desk-top computer having a housing containing a mother board with a processor, includes a passage frame extending from one side to the other side of the housing, and defining a passage penetrating through the housing, the passage having a predetermining cross-sectional area, a chassis partitioning, at the position of the passage frame, the interior of the housing into an upper space and a lower space, the passage frame having a plurality of air intake vents in the wall thereof for taking in external cooling air from the outside into the housing, a heat sink dissipating heat generated by the processor, the heat sink separated from the processor with the chassis interposed therebetween, and a heat pipe thermally coupling the heat sink to the processor.

The passage frame preferably has a generally rectangular cross-section, and the top wall and the side wall of the passage frame preferably have a plurality of air intake vents for taking in cooling air from the outside. The passage frame is preferably arranged close to an internal component to be cooled inside the housing. Preferably, one end of the chassis is supported at a front panel of the housing, and the other end of the chassis is supported at a back panel of the housing, and the chassis on a portion thereof close to the front panel of the housing includes a through-hole for causing the upper space to communicate with the lower space of the housing.

The desk-top computer preferably includes a cooling fan arranged between the passage frame and the heat sink arranged on the chassis, and a discharge vent arranged on the back of the housing.

In accordance with one embodiment of the present invention, a desk-top computer having a housing containing a mother board with a processor, includes a recess portion on each of two sides of the housing, the recess portion having a predetermined cross-sectional area, a chassis partitioning, at the position of the recess portion, the interior of the housing into an upper space and a lower space, the wall of the recess portion having a plurality of air intake vents for taking in external cooling air from the outside into the housing, a heat sink dissipating heat generated by the processor, the heat sink separated from the processor with the chassis interposed therebetween, and a heat pipe thermally coupling the heat sink to the processor.

The cooling air intake structure of the desk-top computer includes one of the passage frame extending from one side to the other side of the housing, and defining a passage penetrating through the housing, the passage having a predetermining cross-sectional area, and the recess portion, on each of the sides of the housing, having a predetermined cross-sectional area. A plurality of air intake vents are arranged on the passage frame and the recess portion. The chassis dividing the interior of the housing into the upper space and the lower space is arranged at the position of one of the passage frame and the recess portion. The heat sink dissipating heat generated by the processor is separated from the processor by the chassis interposed therebetween. The heat sink is thermally coupled to the processor via the heat pipe.

The air intake structure is provided without the need for the air intake vents on the front panel and the side panel of the housing of the computer. Aesthetically acceptable design is enhanced because the air intake vent is opened in an area not seen from the outside. The arrangement is free from the sound of wind blowing that could be generated if air is taken in through the air intake vents on the front panel and the side panel. The arrangement controls the leak of the noise of the cooling fan and the sound of an operating hard disk out of the housing. With one of the passage frame and the recess portion arranged close to the component to be cooled, cooling air is directly introduced, and efficient cooling is achieved. With the chassis interposed between the processor and the heat sink, heat generated the processor is separated from the internal air of the housing. Even more efficient cooling is performed.

Since the processor is separated from the heat sink, a large cooling fan is usable, leading to a low-noise level operation.

With the passage frame penetrating through the housing and the recess portion arranged on each of the sides of the housing, and having a predetermined cross-sectional area, air supplying is possible through both sides of the housing. Even if an object is in the way on one side, air intake efficiency is not lowered.

DESCRIPTION OF THE PREFERRED EMBODIMENTS

A cooling air intake structure and a desk-top computer (hereinafter simply referred to as a computer) of embodiments of the present invention are described below with reference to the drawings.

Figure 1:
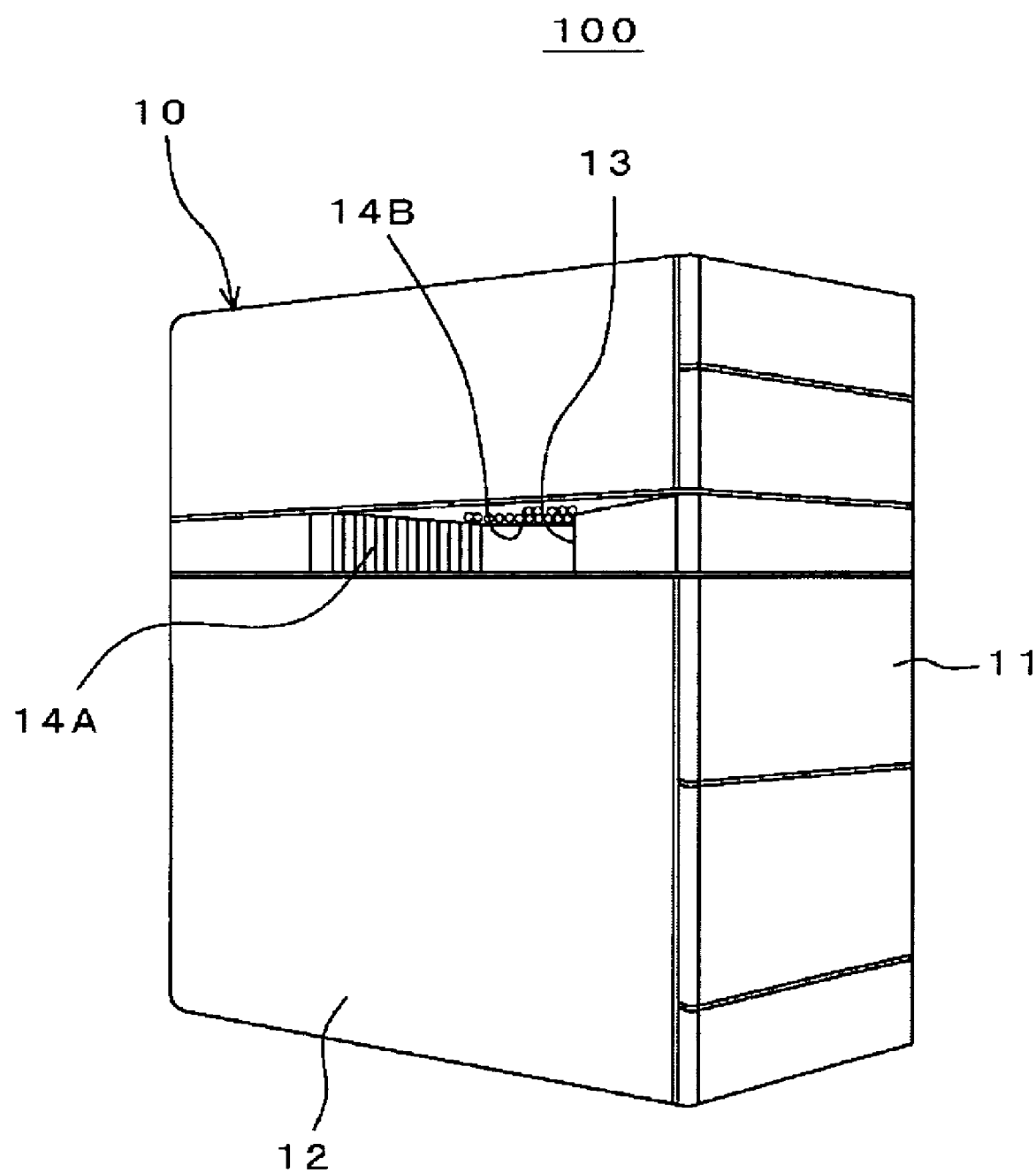
FIG. 1 is an external view of a computer in accordance with a first embodiment of the present invention.

FIG. 1 is an external view of a computer 100 in accordance with a first embodiment of the present invention. The computer 100 has an air intake structure. As shown in FIG. 1, an air intake frame 13 as a passage frame is arranged at a predetermined position of side panels 12 on a housing 10 of the computer 100. The air intake frame 13 has a generally rectangular cross section and includes, in the top portion and the side portions thereof, a plurality of air intake vents 14A and 14B for taking in external air into the housing 10.

Figure 2A:
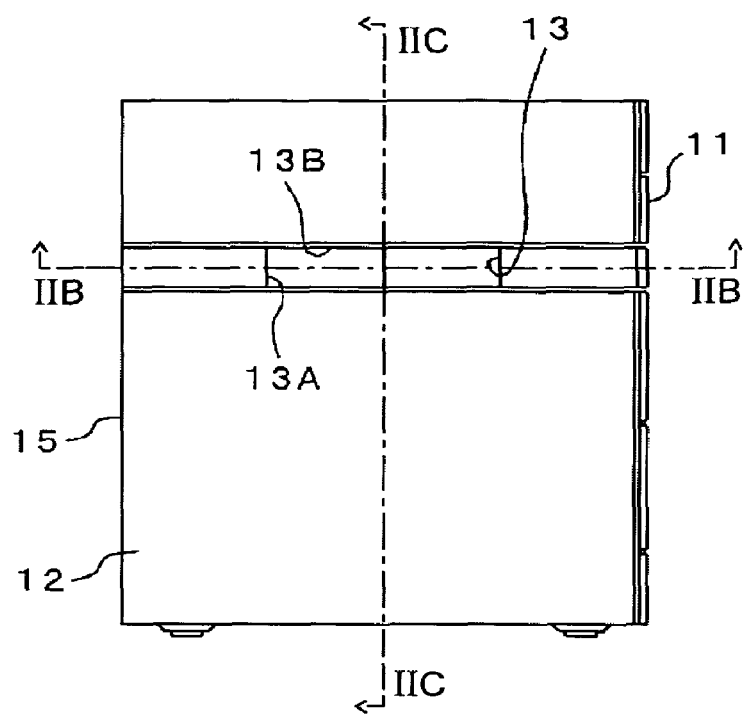
FIGS. 2A-2C illustrate a layout of air intake vents of the computer of the first embodiment of the present invention.
Figure 2B:
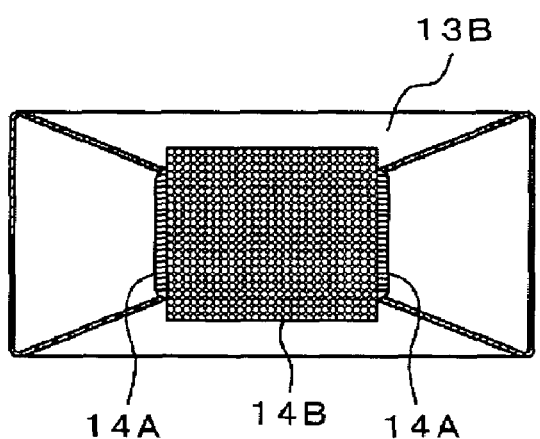
Figure 2C:
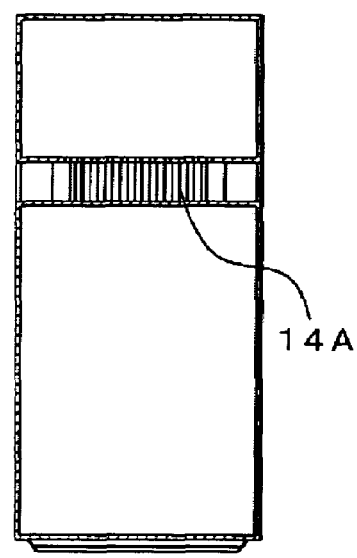

FIGS. 2A-2C illustrate a layout of the air intake vents of the air intake frame 13. FIG. 2A is a side elevational cross-sectional view of the computer 100. FIG. 2B is a horizontal cross-sectional view of the computer 100 taken along line IIB-IIB in FIG. 2A. FIG. 2C is a vertical cross-sectional view of the computer 100 taken along line IIC—IIC in FIG. 2A.

As shown in FIG. 2B, the plurality of air intake vents 14B for introducing external air into the housing 10 are opened in the top portion 13B of the air intake frame 13. As shown in FIG. 2C, the plurality of air intake vents 14A for introducing external air into the housing 10 are opened in the side portions 13A of the air intake frame 13. In this case, the air intake vents 14A are a plurality of elongated generally rectangular slots, and the air intake vents 14B are a plurality of round holes. The computer 100 is thus provided with a sufficient air intake opening area without arranging the air intake vents on the front panel 11 and the side panels 12. The air intake vents 14A and the air intake vents 14B are not directly visible from the outside. As shown in FIGS. 2A–2C, the air intake frame 13 is tapered wide toward the side panels 12 to enhance aesthetic design.

The air intake frame 13 has a predetermined cross-sectional area to assure a predetermined layout of air intake vents and a predetermined intake area. If the opening of the air intake frame 13 is designed to receive the hands of a person, the computer 100 is easily carried as will be shown with reference to FIG. 5.

Figure 3:
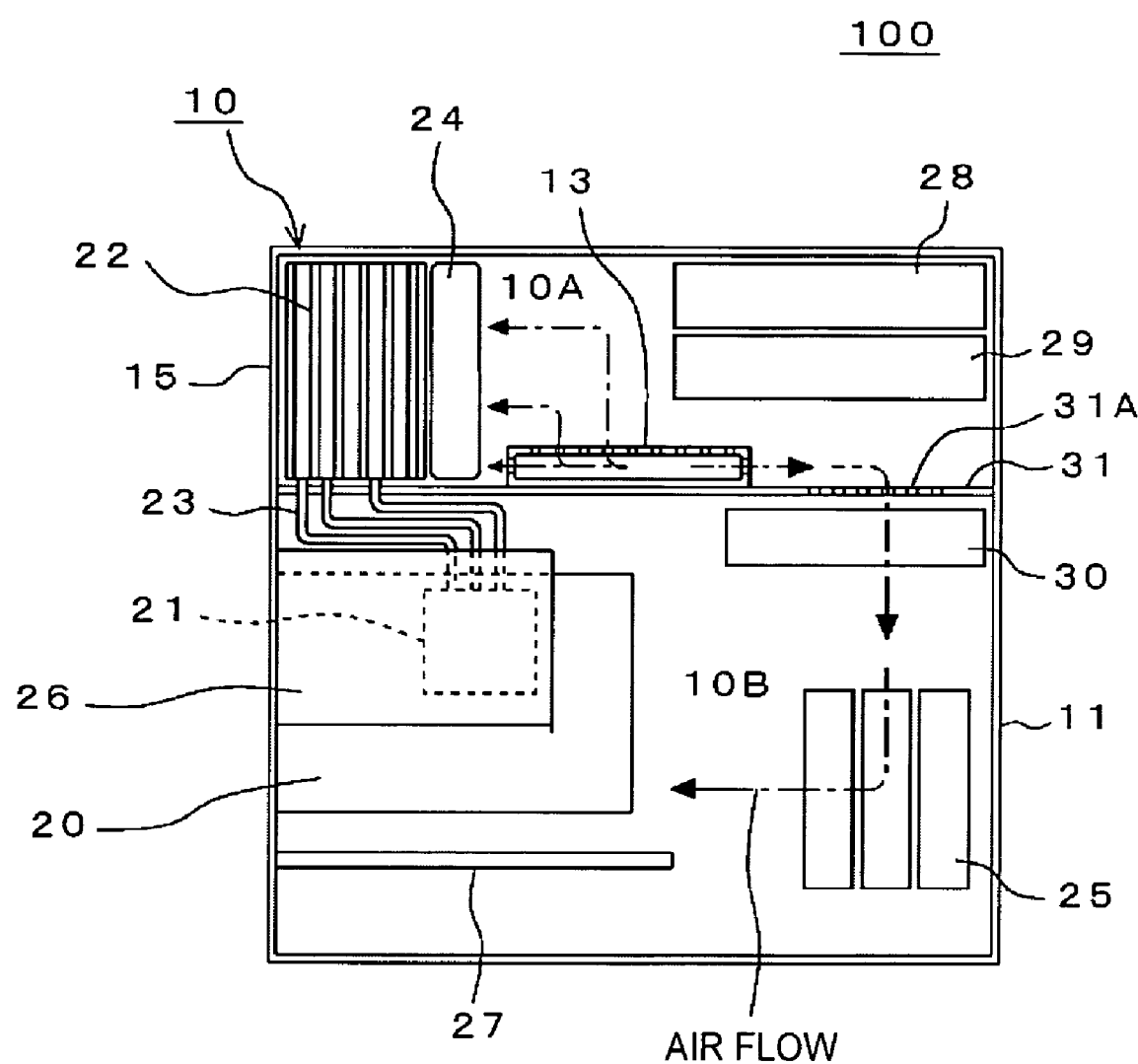
FIG. 3 is an elevational cross-sectional view of the computer in accordance with the first embodiment of the present invention.

FIG. 3 is an elevational cross-sectional view of the computer 100 of the first embodiment of the present invention. Arrow-headed dot-and-dash chain line shown in FIG. 3 represents the direction of the flow of cooling air.

As shown in FIG. 3, the computer 100 includes the air intake frame 13, a mother board 20 having a CPU 21 as a processor, a heat sink 22, a heat pipe 23, a cooling fan 24, a hard disk drive (HDD) 25, a power supply unit 26, a graphics board 27, optical drives 28 and 29, a floppy® drive 30, and a chassis 31.

The housing 10 is partitioned into two spaces (10A and 10B). The air intake frame 13 is arranged on the chassis 31. The chassis 31 is supported with one end thereof at the front panel 11 of the housing 10 with the other end thereof at a back panel 15. A through-hole 31A is opened in the chassis 31 on the front area thereof close to the front panel 11 to cause an upper space 10A to communicate with a lower space 10B.

The heat sink 22, the cooling fan 24, and the optical drives 28 and 29 are housed within the upper space 10A. The cooling fan 24 is arranged between the heat sink 22 and the air intake frame 13. The cooling fan 24 introduces external air through the air intake vents 14A and the air intake vents 14B respectively arranged in the side portion 13A and the top portion 13B of the air intake frame 13. With this arrangement, external air having the same temperature as room temperature is directly supplied to the cooling fan 24.

Since the heat sink 22 and the cooling fan 24 are arranged in the upper space 10A, a large heat sink 22 and a large cooling fan 24 can be used with the housing 10 utilized to the full width thereof. For example, the use of a large cooling fan 24 having a diameter of 120 mm leads to a low-noise operation.

The mother board 20, the hard disk drive 25, the power supply unit 26, the graphics board 27, and the floppy® drive 30 are housed within the lower space 10B of the housing 10. Another hard disk drive may be installed instead of the floppy® drive 30. The CPU 21 is thermally coupled to the heat sink 22 via the heat pipe 23. Heat generated by the CPU 21 is conducted to the heat sink 22 via the heat pipe 23. Heat conducted to the heat sink 22 is dissipated into cooling air by the cooling fan 24. Resulting heated air is discharged through a discharge vent arranged on the back panel of the housing 10.

As shown in FIG. 3, the cooling fan 24 takes in cooling air through the back side portion 13A and the top portion 13B of the air intake frame 13 when the computer 100 is operating. A fan 26F attached to the power supply unit 26 takes in cooling air through the front side portion 13A of the air intake frame 13 and guides the cooling air into the lower space 10B through the through-hole 31A opened in the chassis 31. The used air is then discharged through the discharge vent in the back panel 15 of the housing 10. Cooling air is thus easily introduced into the lower space 10B to cool the hard disk drive 25, the power supply unit 26, the graphics board 27, etc. housed in the lower space 10B of the housing 10.

Figure 4:
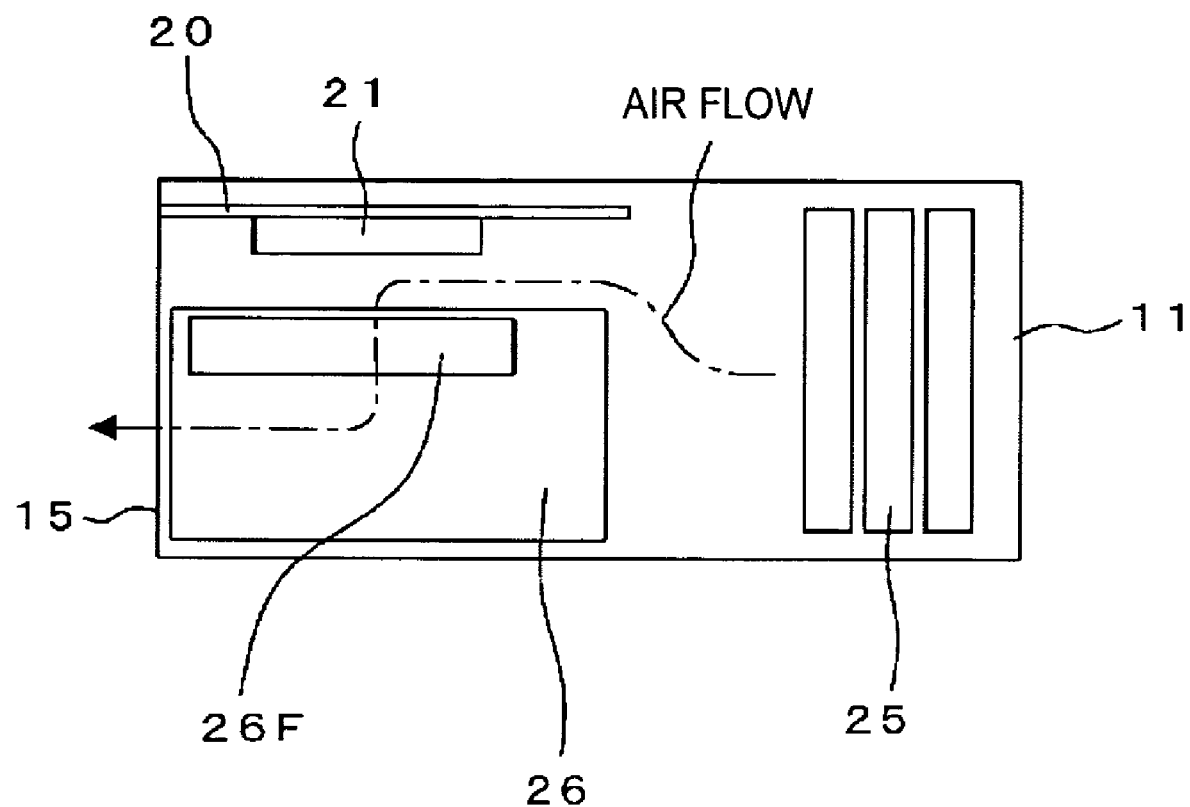
FIG. 4 is a cross-sectional view of a lower section of the computer in accordance with the first embodiment of the present invention.

FIG. 4 is a horizontal cross-sectional view of the lower space 10B of the housing 10. An arrow-headed dot-and-dash chain line shown in FIG. 4 represents the flow of the cooling air. The cooling air is applied to the power supply unit 26 after passing by the hard disk drive 25, and is then discharged through the discharge vent in the back panel 15.

Figure 5:
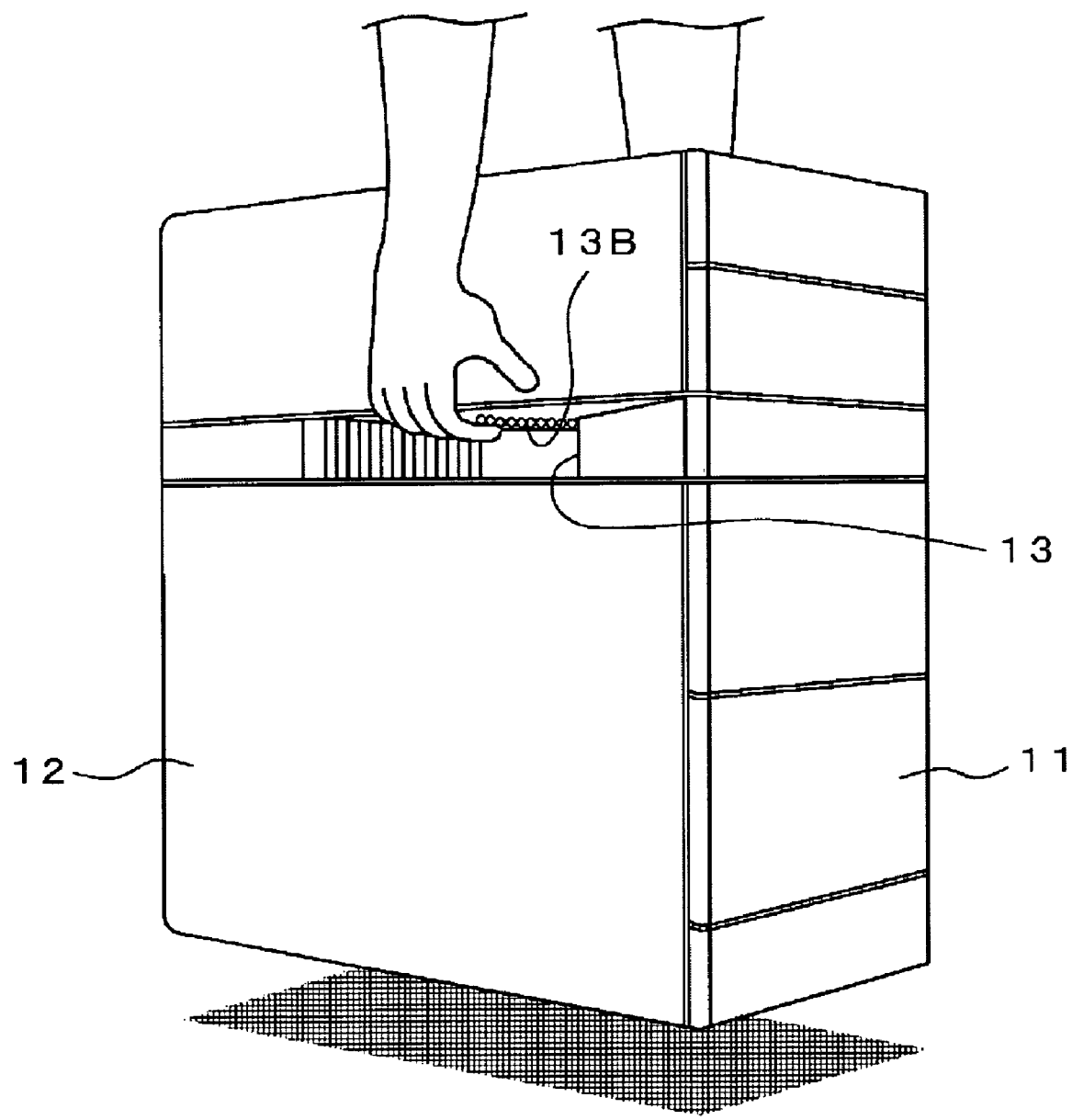
FIG. 5 illustrates the computer, which is carried with top walls held by hands, in accordance with the first embodiment of the present invention.

The air intake frame 13 has a predetermined cross-sectional area large enough receive a hand of a person for carrying the computer 100. As shown in FIG. 5, a person can carry the computer 100 with the hands holding the top portion 13B of the air intake frame 13.

In accordance with the first embodiment of the present invention, the computer 100 includes the cooling air intake structure. More specifically, the air intake frame 13 that laterally penetrates the housing 10 from the one side panel 12 to the other side panel 12, and has a predetermined cross-sectional area. The air intake frame 13 includes the side portions 13A having the plurality of air intake vents 14A and the top portion 13B having the plurality of air intake vents 14B. The chassis 31 is arranged to partition the interior of the housing 10 into the two spaces. The heat sink 22 dissipating heat generated by the CPU 21 is separated from the CPU 21 by the chassis 31. The heat pipe 23 is arranged to thermally couple the CPU 21 to the heat sink 2.

The computer 100 has a sufficient air intake opening without the need for air intake vents on the front panel and the back panel of the housing 10 thereof. Since the air intake vents 14A and the air intake vents 14B are arranged in the area not directly visible from the outside, an aesthetically preferable design is thus achieved. The computer 100 is free from the sound of wind blowing that could be generated if air is taken in through the air intake vents on the front panel and the side panel. The computer 100 controls the leak of the noise of the cooling fan and the sound of an operating hard disk out of the housing. With the air intake frame 13 arranged closely to the components to be cooled, external air is directly introduced to cool the components. Cooling efficiency is thus enhanced. Since the chassis 31 separates the CPU 21 from the heat sink 22, heat generated by the CPU 21 is prevented from being in contact with the general cooling air in the housing 10. Cooling efficiency is even more enhanced.

The arrangement in which the CPU 21 is separated from the heat sink 22 permits a larger cooling fan 24 to be used, and a low-noise operation is thus performed.

The use of the air intake frame 13 penetrating through the housing 10 permits the computer 100 to take in air from both sides. Even if an object is in the way of air flow on one side, air intake efficiency is not lowered.

Since the chassis 31 is supported by the front panel 11 and the back panel 15, mechanical strength of the housing 10 is increased. No particular handle for carrying the computer 100 is required because the air intake frame 13 can serve this purpose. Furthermore, the computer 100 can be carried safely because a person can lift the computer 100 by directly holding the housing 10 of the computer 100.

Figure 6A:
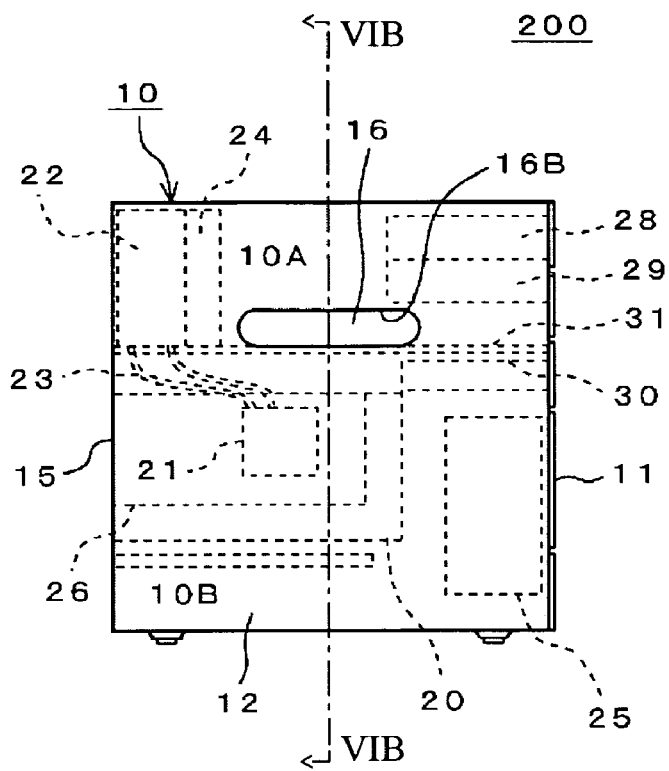
FIGS. 6A and 6B illustrate a computer in accordance with a second embodiment of present invention.
Figure 6B:
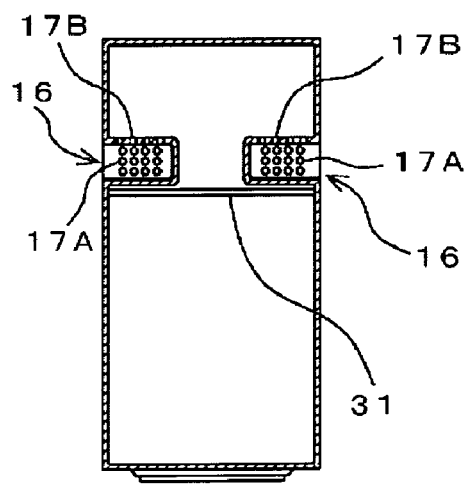

FIGS. 6A and 6B illustrate a computer 200 in accordance with a second embodiment of the present invention. The computer 200 includes a cooling air intake structure. FIG. 6A is a side view of the computer 200. FIG. 6B is an elevational cross-sectional view of the computer 200, taken along line IVB-IVB in FIG. 6A, with internal components not shown.

As shown in FIGS. 6A and 6B, the housing 10 of the computer 200 includes an air intake frame 16 as a recess portion on each of both side panels 12. The air intake frame 16 has a round-ended elongated rectangular shape in cross section. The air intake frame 16 includes a side portion 16A and a top portion 16B. A plurality of air intake vents 17A are opened in the side portion 16A, and a plurality of air intake vents 17B are opened in the top portion 16B.

The computer 200 includes the air intake frame 16, a mother board 20 having a CPU 21, a heat sink 22, a heat pipe 23, a cooling fan 24, a hard disk drive (HDD) 25, a power supply unit 26, a graphics board 27, optical drives 28 and 29, a floppy® drive 30, and a chassis 31.

As previously discussed, the housing 10 is divided into an upper space 10A and a lower space 10B. The chassis 31 includes a through-hole 31A that causes the upper space 10A and the lower space 10B to communicate each other.

The computer 200 of the second embodiment is identical to the computer 100 of the first embodiment in the layout of the components. The discussion of the layout of the components is thus omitted here.

In accordance with the second embodiment of the present invention, the computer 200 includes a cooling air intake structure. More specifically, the computer 200 includes the air intake frame 16 having a predetermined cross-sectional area on each of the side panels 12. The side portion 16A and the top portion 16B of the air intake frame 16 include the plurality of air intake vents 17A and the plurality of air intake vents 17B for taking in cooling air, respectively. The chassis 31 is arranged at the position of the air intake frame 16 to partition the interior of the housing 10 into the two spaces. The heat sink 22 dissipating heat generated by the CPU 21 is separated from the CPU 21 by the chassis 31. The heat pipe 23 is arranged to thermally couple the CPU 21 to the heat sink 22.

The computer 200 has sufficient air intake opening without the need for air intake vents on the front panel and the back panel of the housing 10 thereof. Since the air intake vents 17A and the air intake vents 17B are arranged in the area not directly visible from the outside, an aesthetically preferable design is achieved. The computer 200 is free from the sound of wind blowing that could be generated if air is taken in through the air intake vents on the front panel and the side panel. The computer 200 controls the leak of the noise of the cooling fan and the sound of an operating hard disk out of the housing. With the air intake frame 16 arranged closely to the components to be cooled, external air is directly introduced to cool the components. Cooling efficiency is thus enhanced. Since chassis 31 separates the CPU 21 from the heat sink 22, heat generated by the CPU 21 is prevented from being in contact with the general cooling air in the housing 10. Cooling efficiency is even more enhanced.

The arrangement in which the CPU 21 is separated from the heat sink 22 permits a larger cooling fan 24 to be used, and a low-noise operation is performed.

The use of the air intake frame 16 arranged on each of the side panels 12 and having a predetermined cross-sectional area permits the computer 100 to take in air from both sides. Even if an object is in the way of air flow on one side, air intake efficiency is not lowered.

Since the chassis 31 is supported by the front panel 11 and the back panel 15, mechanical strength of the housing 10 is increased.

In the first embodiment of the present invention, the computer 100 includes the air intake frame 13 having a generally rectangular shape in cross section. The present invention is not limited to this shape. The air intake frame 13 may have another cross-sectional shape. The location of the air intake frame 13 may be changed as necessary.

FIGS. 7A–7D are side views of the computer 100 having other examples of the air intake frame.

Figure 7A:
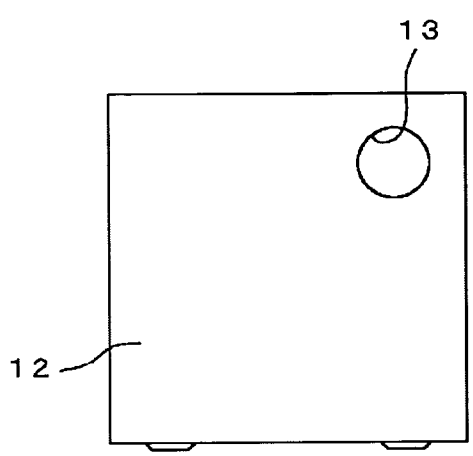
FIGS. 7A-7D illustrate other examples of the air intake vents.

FIG. 7A illustrates an air intake frame having a circular cross-section. In this case, the air intake frame 13 having the circular cross section is arranged on the right top portion of the side of the computer 100. A plurality of air intake vents are opened in the cylindrical wall of the air intake frame.

Figure 7B:
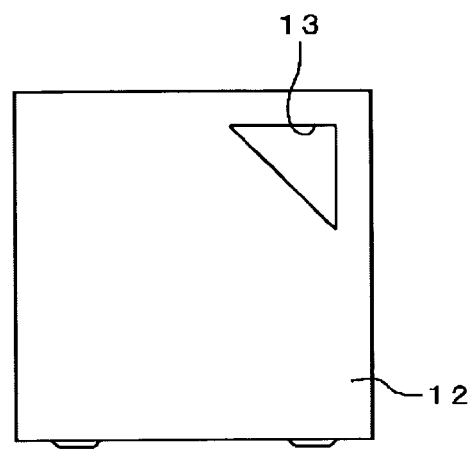

FIG. 7B illustrates an air intake frame having a triangular cross-section. In this case, the air intake frame having the triangular cross section is arranged on the right top portion of the side of the computer 100. A plurality of air intake vents are opened in a top wall and a slant wall of the air intake frame.

Figure 7C:
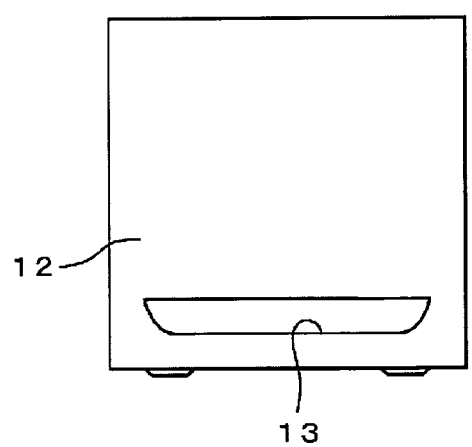

FIG. 7C illustrates an air intake frame having an elongated, generally rectangular cross section. In this case, the air intake frame having the elongated, generally rectangular cross section is arranged on the lower portion of the side of the computer 100. A plurality of air intake vents are opened in a side wall and a top wall of the air intake frame.

Figure 7D:
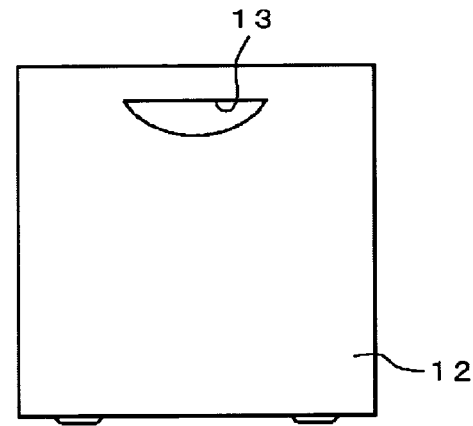
Figure 8:
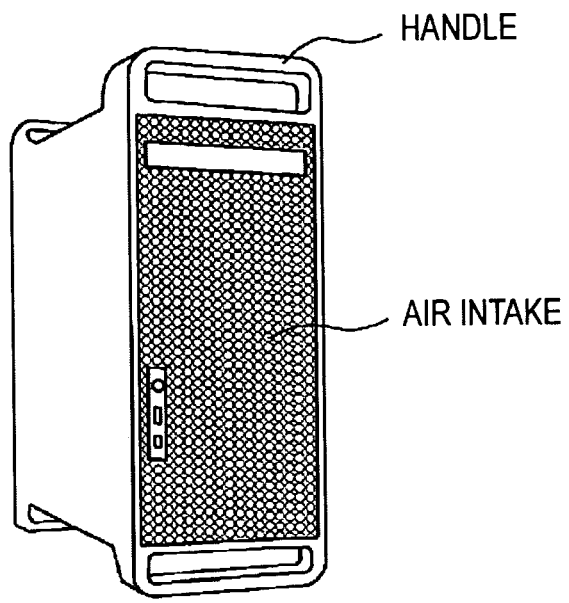
FIG. 8 illustrates a known computer having air intake vents on the front panel thereof.
Figure 9:
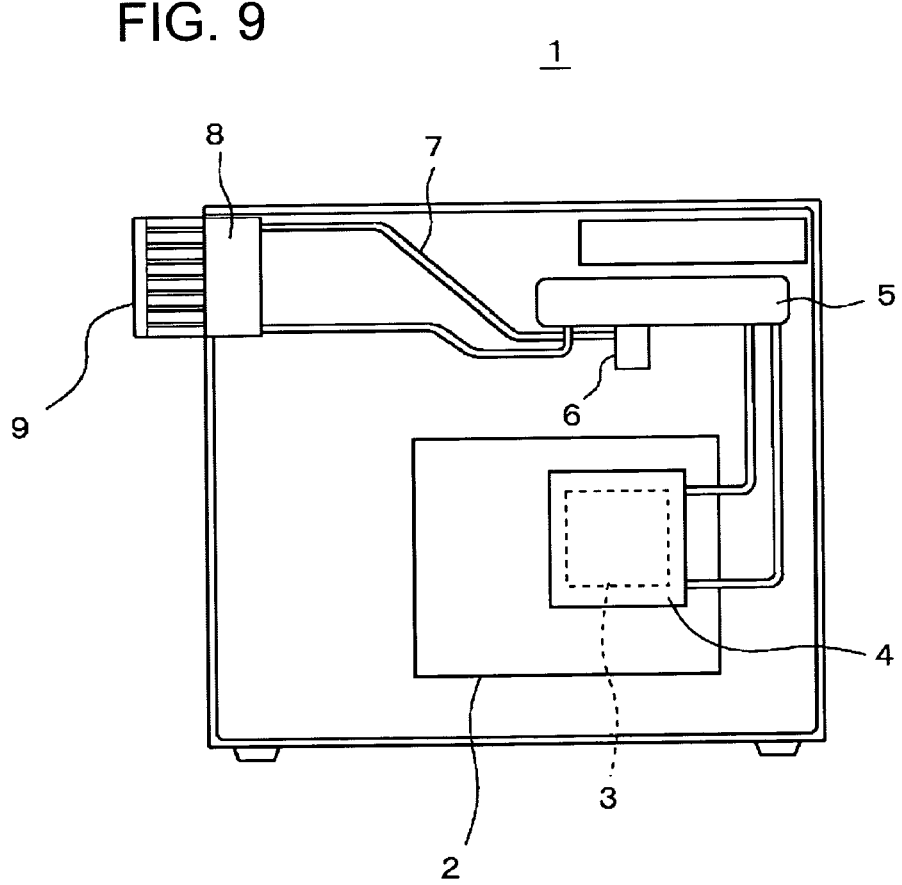
FIG. 9 illustrates a known computer employing a known water-cooling system.

FIG. 7D illustrates an air intake frame having a segment shape in cross section. In this case, the air intake frame having the segment shape is arranged on the upper portion of the side of the computer 100. A plurality of air intake vents are opened in a top wall and a bottom wall of the air intake frame.

In the second embodiment of the present invention, the computer 200 includes the air intake frame 16 on each of the side panels 12. The present invention is not limited to this arrangement. The air intake frame 16 may be arranged on only one side panel 12.

In the second embodiment of the present invention, the air intake frames 16 may be arranged on both side panels 12 in non-symmetrical positions.

It should be understood by those skilled in the art that various modifications, combinations, sub-combinations and alterations may occur depending on design requirements and other factors insofar as they are within the scope of the appended claims or the equivalents thereof.

What is claimed is:

1. A cooling air intake structure of a desk-top computer having a housing containing a mother board with a processor, the cooling air intake structure comprising:
   one of
      a passage frame extending from one side to an opposite side of the housing, and defining a passage penetrating through the one side and the opposite side of the housing, the passage having a predetermined cross-sectional area, and
      a recess portion, on each of the sides of the housing, having a predetermined cross-sectional area,
   each of the passage frame and the recess portion having a plurality of air intake vents in the wall thereof.

2. The cooling air intake structure according to claim 1, wherein one of the passage frame and the recess portion is arranged close to an internal component inside the housing to be cooled.

3. A desk-top computer having a housing containing a mother board with a processor, the desk-top computer comprising:
- a passage frame, extending from one side to an opposite side of the housing, and defining a passage penetrating through the one side and the opposite side of the housing, the passage having a predetermined cross-sectional area;
- a chassis partitioning, at the position of the passage frame, the interior of the housing into an upper space and a lower space, the passage frame having a plurality of air intake vents in the wall thereof for taking in external cooling air from the outside into the housing;
- a heat sink dissipating heat generated by the processor, the heat sink separated from the processor with the chassis interposed therebetween; and
- a heat pipe thermally coupling the heat sink to the processor.

4. The desk-top computer according to claim 3, wherein the passage frame is arranged close to an internal component to be cooled inside the housing.

5. The desk-top computer according to claim 3, wherein the passage frame has a generally rectangular cross-section, and wherein the top wall and the side wall of the passage frame have a plurality of air intake vents for taking in cooling air from the outside.

6. The desk-top computer according to claim 3, wherein one end of the chassis is supported at a front panel of the housing, and the other end of the chassis is supported at a back panel of the housing, and wherein the chassis on a portion thereof close to the front panel of the housing has a through-hole for causing the upper space to communicate with the lower space of the housing.

7. The desk-top computer according to claim 3, further comprising a cooling fan arranged between the passage frame and the heat sink arranged on the chassis; and a discharge vent arranged on the back of the housing.

8. A desk-top computer having a housing containing a mother board with a processor, the desk-top computer comprising:
- a recess portion, on each of two opposite sides of the housing, having a predetermined cross-sectional area;
- a chassis partitioning, at the position of the recess portion, the interior of the housing into an upper space and a lower space, the recess portion having a plurality of air intake vents in the wall thereof for taking in external cooling air from the outside into the housing;
- a heat sink dissipating heat generated by the processor, the heat sink separated from the processor by the chassis interposed therebetween; and
- a heat pipe thermally coupling the heat sink to the processor.

9. The desk-top computer according to claim 8, wherein the passage frame is arranged close to an internal component to be cooled inside the housing.

10. The desk-top computer according to claim 8, wherein one end of the chassis is supported at a front panel of the housing, and the other end of the chassis is supported at a back panel of the housing, and wherein the chassis on a portion thereof close to the front panel of the housing having a through-hole for causing the upper space to communicate with the lower space of the housing.

11. The desk-top computer according to claim 8, further comprising a cooling fan arranged between the passage frame and the heat sink arranged on the chassis; and a discharge vent arranged on the back of the housing.

* * * * *